United States Patent [19]
Cutler et al.

[11] 4,449,088
[45] May 15, 1984

[54] COMMUTATION FAILURE CORRECTION SCHEME FOR A CONTROLLED CURRENT INVERTER

[75] Inventors: John H. Cutler, Roanoke, Va.; John D. D'Atre, Saratoga, N.Y.; Loren H. Walker, Salem, Va.

[73] Assignee: General Electric Company, Salem, Va.

[21] Appl. No.: 333,930

[22] Filed: Dec. 23, 1981

[51] Int. Cl.³ .................. H02M 1/06; H02P 13/24
[52] U.S. Cl. .................. 318/798; 318/806; 363/57; 363/58
[58] Field of Search .......... 318/798, 806; 363/57, 363/58; 361/92

[56] References Cited

U.S. PATENT DOCUMENTS

| | | |
|---|---|---|
| 3,821,630 | 6/1974 | Kornrumpf et al. |
| 4,161,010 | 7/1979 | Mann et al. .................. 363/54 |
| 4,183,081 | 1/1980 | Cutler et al. .................. 363/138 |
| 4,251,763 | 2/1981 | Walker et al. .................. 363/58 |
| 4,309,731 | 1/1982 | Okado .................. 363/138 |

OTHER PUBLICATIONS

"Current Source Converter for AC Motor Drives", by K. E. Phillips, IEEE Conference Record of 1971 Sixth Annual Meeting of the IEEE Industry and General Applications Group.

*Primary Examiner*—David Smith, Jr.
*Attorney, Agent, or Firm*—Arnold E. Renner

[57] ABSTRACT

A system, for use with a controlled current inverter to prevent malfunction of inverter action resulting from an insufficient capacitor voltage to effect commutation of an inverter bridge controlled rectifier, provides that the capacitor voltage is sensed and, if it is of insufficient value to effect rectifier commutation, the application of gating signals to the next to be rendered conductive controlled rectifier is inhibited. In order to achieve initial inverter operation, the inverter current is also sensed and the inhibit function is rendered ineffective until such time as the current reaches a predetermined value.

7 Claims, 4 Drawing Figures

COMMUTATION FAILURE CORRECTION SCHEME FOR A CONTROLLED CURRENT INVERTER

BACKGROUND OF THE INVENTION

The present invention relates generally to controlled current inverters and more particularly to a scheme for the recovery of an inverter bridge operation malfunction in which the commutating capacitor voltage is insufficient to effect proper controlled rectifier commutation.

It has been found when a controlled current inverter having a controlled rectifier bridge is employed to control an ac motor in the regenerative braking mode, the situation sometimes develops where the voltage on a commutating capacitor is not sufficient to effect the commutation (turning off) of one bridge controlled rectifier when the next controlled rectifier is rendered conductive. If this situation is permitted to continue, control of the bridge may be lost and the operation thereof may degrade until all control is lost and the bridge operates as a diode rectifier bridge. This problem has been found to be particularly prevelant in situations in which two bridges are used to control a single motor. An example of such dual bridge operation is found in co-pending U.S. Pat. No. 4,349,772 for "Method and Apparatus for Controlling An Alternating Current Motor Load Using Plural Controlled-Current Inverter Circuits" by Herbert W. Weiss, issued Sept. 14, 1982 which patent is assigned to assignee of the present invention. In this type of system, two six-pulse inverters are connected to transfer power between a motor and a source of power. When these inverters are of the controlled current type and the motor is operating in the regenerative mode such that the resultant power flow is from the motor to the source, it has been discovered that in certain instances only one of the six-pulse inverters is required to maintain motor flux and, thus, operate as a forced commutated inverter. Depending upon the circumstances, the other inverter may operate in varying degrees of load commutation or may, in fact, degrade to operation as a simple diode rectifier bridge such that the full capabilities of the equipment are not realized and totally reliable operation is not achieved.

SUMMARY OF THE INVENTION

It is, therefore, an object of the present invention to provide a scheme to permit reliable operation of a controlled current inverter in the regenerative mode to realize the full capabilities of the equipment.

It is a further object to provide a recovery scheme for preventing operational degradation of a controlled current inverter into operation as a diode rectifier bridge.

It is a further object to provide a scheme for controlling the time of rendering conductive the controlled rectifiers of a controlled current inverter bridge as a function of a commutation capacitor voltage.

The foregoing and other objects are achieved in accordance with the invention by providing, in a controlled current inverter bridge which has a plurality of legs each including a controlled rectifier and further including an associated commutating capacitor across which an electrical voltage is developed to effect commutation of the controlled rectifier, means to sense the voltage across the capacitor, which voltage is intended to cause the commutation of one rectifier in response to the rendering conductive of a next to be rendered conductive rectifier. This sensed voltage is then compared with a reference value and upon achieving a predetermined relationship, a signal is provided which permits the gating pulses to be applied to the next to be fired rectifier. In the absence of such an enabling signal these gating pulses are inhibited. The invention further includes, in order to permit initial startup, that the bridge current is sensed and prior to that current reaching a predetermined value the inhibiting function is overridden or rendered ineffective such that gating signals are permitted to be supplied to the several bridge rectifiers regardless of the capacitor voltage.

BRIEF DESCRIPTION OF THE DRAWING

While the present invention is defined in particularity in the claims annexed to and forming a part of this specification, a better understanding can be had from the following description taken in conjunction with the accompanying drawings in which:

DETAILED DESCRIPTION

Figure 1:
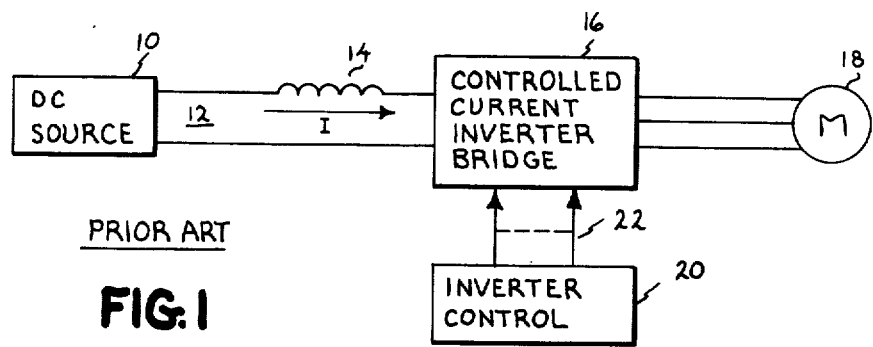
FIG. 1 is a major block diagram in accordance with the prior art illustrating a suitable environment for the present invention.

Reference is first made to FIG. 1 which shows a typical prior art controlled current inverter system for supplying an electric motor. As illustrated, a source of direct current 10 supplies a current I by way of a dc link circuit 12, which includes a suitable filter 14, to a controlled current inverter bridge 16. The output of the bridge 16 is shown as a three-phase output which is supplied to a motor 18. The operation of the bridge 16 is under the control of a suitable control illustrated at 20 which serves to supply control signals to the bridge by way of lines 22. The most prevalent form of inverter bridge in today's state of the art is that employing thyristors as more fully discussed with respect to FIG. 2. In this case the signals applied via lines 22 would be gating signals applied to the thyristor gate electrodes. In the following description the term thyristor(s) will be used for sake of convenience, it being understood that the present invention is applicable to controlled devices generally.

Figure 2:
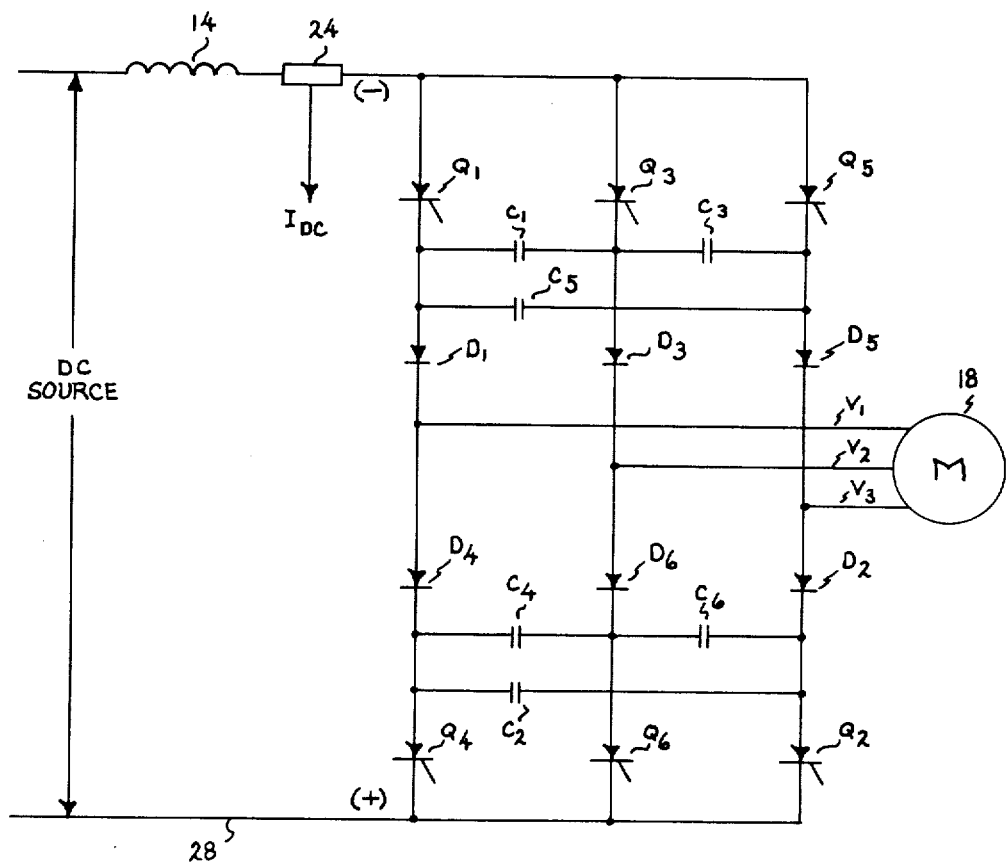
FIG. 2 is a schematic drawing in accordance with the prior art illustrating a typical six-pulse controlled current inverter bridge as connected to a motor load.

FIG. 2 illustrates a typical prior art controlled current inverter bridge. The bridge is comprised of three vertical legs. As shown, the left leg includes the series connection of a thyristor $Q_1$, a diode $D_1$, a diode $D_4$ and a thyristor $Q_4$. In a similar manner, the middle leg includes thyristor $Q_3$, diode $D_3$, diode $D_6$ and thyristor $Q_6$ while the right-hand leg has thyristor $Q_5$, diode $D_5$, diode $D_2$ and thyristor $Q_2$. As is well known, the connections to the motor 18 (lines $V_1$, $V_2$ and $V_3$) are from diode junction points within the bridge. Suitable commutating capacitors $C_1$, $C_3$ and $C_5$ are connected in the upper half of the bridge between the cathodes of each pair of thyristors $Q_1$, $Q_3$ and $Q_5$ in the manner illustrated and, similarly, in the lower half capacitors $C_2$, $C_4$ and $C_6$ are connected between the anodes of thyristors $Q_2$, $Q_4$ and $Q_6$. The basic construction and operation of such a bridge is believed well known but if additional details are desired, reference is made to the article "Current Source Converter For AC Motor Drives" by Kenneth E. Phillips, which appears in *IEEE Conference Record of* 1971 *Sixth Annual Meeting of the IEEE Industry and General Applications Group* (copyright 1971 by the Institute of Electrical and Electronic Engineers, Inc.) which article is specifically incorporated hereinto by reference. Suffice it to say for the present that when the bridge is operated in the regenerative mode such that the motor 18 is supplying power to the dc source, the upper bridge bus 26 will be negative with respect to the lower bus 28. An additional point to be considered with respect to FIG. 2 is that there is included a suitable current sensor 24 which provides an output signal, $I_{dc}$, which is proportional to the dc current within the link 12 (FIG. 1). In FIG. 2 the subscript notation with respect to the thyristors and diodes represents their order of conduction under normal circumstances.

Figure 3:
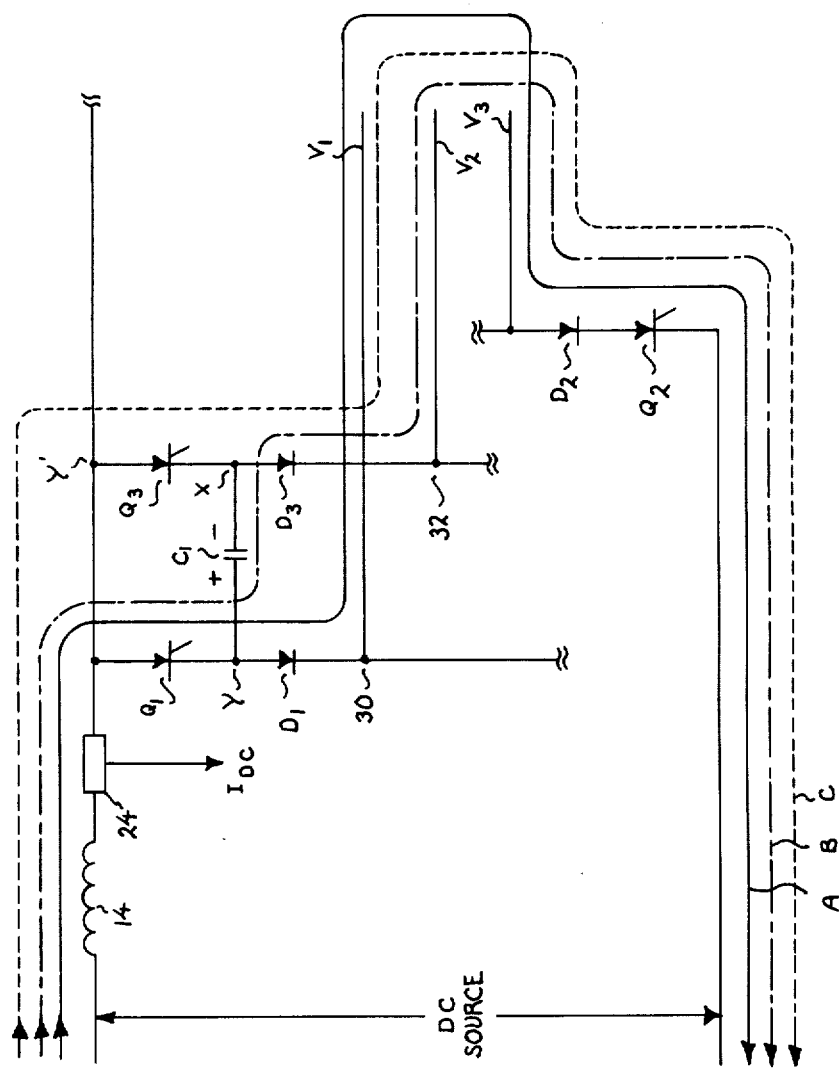
FIG. 3 is a schematic drawing of a portion of the bridge shown in FIG. 2 and further illustrating current paths which are helpful in understanding the present invention; and, FIG. 4 is a schematic diagram illustrating the present invention in its preferred embodiment.

The basic operation and the problems which the present invention solve are believed to be easier understood with respect to FIG. 3 which shows only a portion of the elements of the total bridge, the remaining portions being omitted for purposes of clarity. If it is assumed that the motor is operating in the regenerative mode, there appears at the output terminals (lines) $V_1$, $V_2$ and $V_3$ voltages which represent a source of electrical energy. Let it first be assumed that thyristor $Q_1$ and diode $D_1$ are conducting as are diode $D_2$ and thyristor $Q_2$. The current path is, for this situation, illustrated by the solid line A. Under normal circumstances, capacitor $C_1$ will have developed on it a charge such that its left-hand plate is positive, as indicated, and thus when a gating signal is applied to the gate electrode of thyristor $Q_3$, a circulating path including capacitor $C_1$ will be such that, assuming the charge on capacitor $C_1$ is sufficient, thyristor $Q_1$ will be commutated or turned off and the eventual current path will be by way of thyristor $Q_3$, diode $D_3$ terminals $V_2$ and $V_3$ diode $D_2$ and thyristor $Q_2$. If, however, for any reason capacitor $C_1$ does not develop sufficient charge to commutate thyristor $Q_1$, upon rendering thyristor $Q_3$ conductive, $Q_1$ will remain in the conducting state and no way exists to establish a charge on capacitor $C_1$. Thus, control with respect to at least this portion of the bridge is lost and a diode rectifier operation tends to exist. If this situation is allowed to continue and other capacitors fail to develop charges, the whole top half of the bridge, as illustrated in FIG. 2, may lose control and the bridge will degrade into a pure rectifier type of operation.

In accordance with the present invention the rendering conducting of thyristor $Q_3$ is prohibited (inhibited) until such time as there is sufficient voltage on capacitor $C_1$ to commutate thyristor $Q_1$. Again referencing FIG. 3, when $Q_1$ and $D_1$ are conducting and the voltage at point 30 is more negative than that at point 32 diode $D_3$ cannot conduct and the current path is as illustrated by the solid line. When, however, the voltage at point 32 becomes more negative than that at point 30, diode $D_3$ can conduct and a current path is established which includes thyristor $Q_1$, capacitor $C_1$, diode $D_3$, diode $D_2$ and thyristor $Q_2$. This current path is illustrated by dot-dash line B and serves to establish a voltage across capacitor $C_1$ in the direction illustrated in FIG. 3.

In accordance with the present invention, by sensing the voltage across capacitor $C_1$ it can be determined when the voltage is of sufficient value in the polarity illustrated in FIG. 3 to commutate thyristor $Q_1$. By withholding the gate signals from $Q_3$ until such time as the charge on the capacitor is sufficient to effect commutation, upon the subsequent gating of thyristor $Q_3$, a current path will now be established as indicated by the dotted line C which includes thyristor $Q_3$, diode $D_3$, diode $D_2$ and thyristor $Q_2$. Similar paths, of course, exist with respect to the other thyristors and diodes of the bridge. It is, however, believed unnecessary to describe these paths in detail since all are of a similar nature, according to the thyristors involved.

Figure 4:
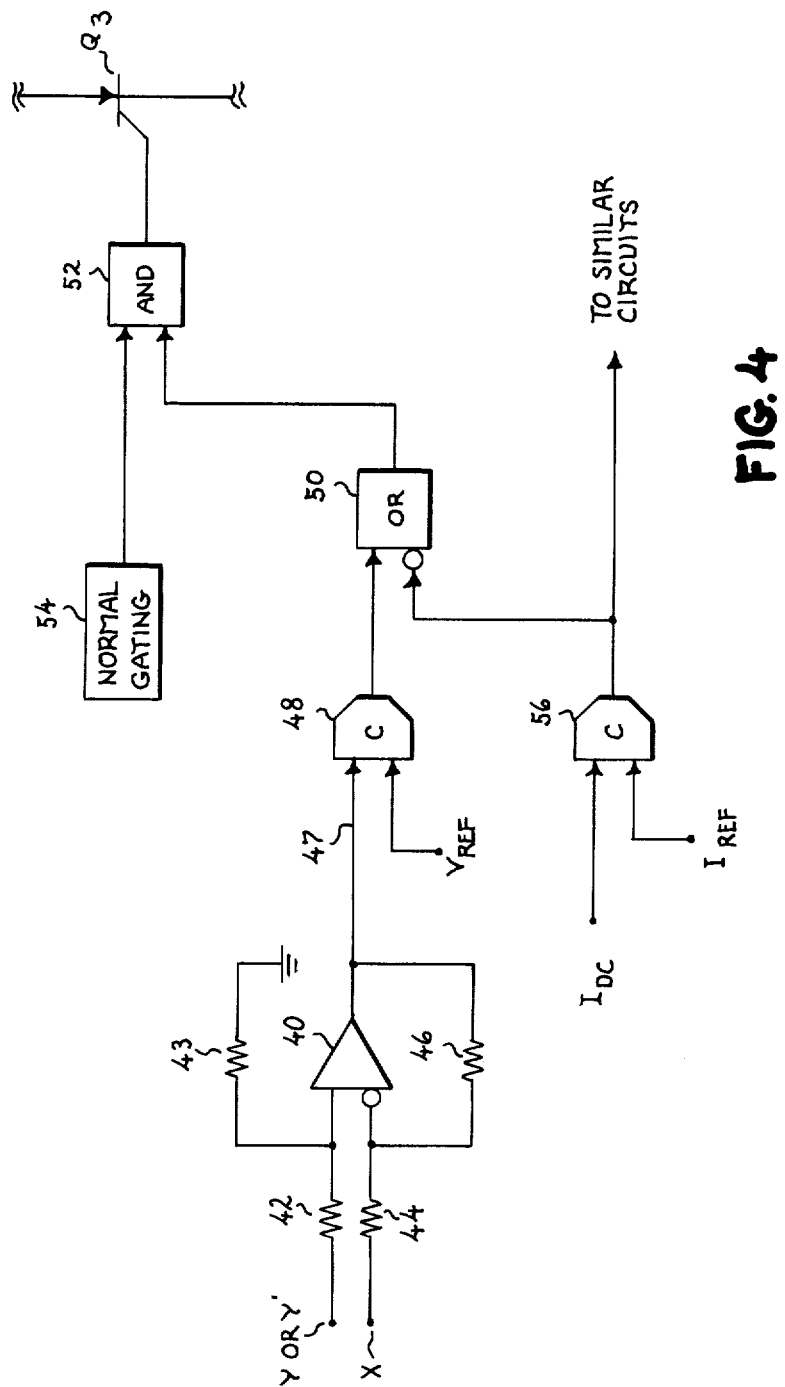

FIG. 4 illustrates the present invention in analog form; although it is to be specifically recognized that digital implementation could be employed with equal facility. As has been indicated, the correction function of the present invention is achieved by sensing capacitor voltages. These voltages may be sensed directly across the respective capacitor, as indicated in FIG. 3 by nodes X and Y or by sensing the voltage across the appropriate thyristor. This is shown in FIG. 3 with respect to capacitor $C_1$, by nodes X and Y' across thyristor $Q_3$. It will be recognized that when $Q_3$ is not conducting and $Q_1$ is conducting, the time period during which the capacitor voltage sensing is desired, the voltage across thyristor $Q_3$ will be essentially that of the $C_1$ capacitor voltage, differing therefrom only by the voltage drop across thyristor $Q_1$. One reason for selecting this as an alternative to direct sensing of the capacitor voltage is that in many systems the voltage across the various thyristors of the bridge is sensed for other reasons and, thus, this signal is more readily available and additional circuitry to sense capacitor voltage directly is not, therefore, required. An additional but more important reason for utilizing the thyristor voltage is that this voltage is representative of the proper capcitor voltage for both directions of motor rotation.

In FIG. 4 the voltages at the X and Y (or Y') are applied as inputs to a operational amplifier connected in the differential mode. The Y voltage is applied to amplifier 40 by way of resistors 42 and 43 while the X voltage is applied to the inverting input of that amplifier by way of resistor 44. Feedback resistor 46 is connected between the amplifier output and its inverting input such that its output on line 47 is a signal representative of the value of the capacitor voltage. This value is compared in a comparator circuit 48 with a reference signal $V_{REF}$ which has a value, which may be variable, corresponding to a capacitor voltage sufficient to commutate a conducting thyristor within the bridge (e.g. thyristor $Q_1$). Thus, comparator 48 will provide an output signal only when the capacitor voltage is sufficient to effect commutation. The output from comparator 48 is applied by way of an OR gate 50 to an AND gate 52. The second input of AND gate 52 receives gating signals from block 54 which are the normal gating signals for the thyristor. For example, these would be the signals derived from the inverter control 20 by way of lines 22 in FIG. 1. The output of AND gate 52 is applied to the gate electrode of a thyristor, in the example being given, thyristor $Q_3$. Thus, it is seen that with respect to the portion of circuit thus far described, the only time the normal gating signals from 54 can be passed to the thyristor is when the AND gate 52 is enabled by the output of the comparator 48 indicating that there is sufficient capacitor voltage to effect commutation. At all other times, the gating signals from block 54 are inhibited except as shall be described below. It is, perhaps, proper at this stage to say that one requirement of this invention, for the gating signals, is that they exist during the full period of time which it is permissible to render a thyristor conductive. This may be achieved by either a continuous signal or by pulse-train firing in accordance with well known principles.

Insofar as normal operation of the control current inverter is concerned, that described thus far is all that is necessary. It will be recognized, however, that upon initial starting of the system, no appreciable capacitor voltage will exist unless some form of auxillary charging system is employed. OR gate 50 and the remaining portion of the depiction of FIG. 4 serve to establish initial operation. The $I_{dc}$ signal which was earlier described and which was derived from the current sensor 24 (see FIGS. 2 and 3) is applied as one input to a comparator 56, the other input of which is a reference signal designated by $I_{REF}$. This reference signal will normally have a value representing some fraction of rated current, (e.g., five percent) such that when the system is initially placed into operation and no voltage is anticipated on the capacitors, the output of the comparator which will be a low level signal. This low level signal is applied to the inverting input of OR gate 50, the output of which will serve to enable AND gate 52. When, however, the current $I_{dc}$ rises to the selected current value and sufficient capacitor voltage should be present, comparator 56 will provide a high level output signal which will not, of course, be passed by gate 50. The inhibit (enable) function of AND gate 52 is now solely under control of the capacitor voltage as earlier described.

While FIG. 4 shows the circuitry associated with only one capacitor, it is apparent that similar circuits will be provided for each of the gating controls of each of the thyristors within the bridge. Since the current is the same for the entire bridge, only one current measurement and comparison need be made. Thus the output comparator 56 is shown as being provided similar circuits; i.e., it would be applied to similar OR gates "50" associated with each of the other thyristors.

While there has been shown and described what is at present considered to be the preferred embodiment of the present invention, modifications thereto will readily occur to those skilled in the art. It is not desired, therefore, that the invention be limited to the specific arrangement shown and described and it is intended to cover in the appended claims all such modifications as fall within the true spirit and scope of the invention.

What is claimed is:

1. For use in conjunction in a controlled inverter bridge of the type having a plurality of legs each having a controlled rectifier and further including an associated commutating capacitor across which an electrical voltage is developed to effect thyristor conduction commutation to thereby transfer current from one controlled rectifier to another through the sequential rendering conductive of controlled rectifiers, recovery circuitry for recovery from a bridge malfunction condition resulting from insufficient capacitor voltage to effect controlled rectifier commutation comprising;
    (a) means to develop a voltage signal representative of the voltage across the capacitor associated with the controlled rectifier to be cummutated;
    (b) means to compare said voltage signal with a reference signal of predetermined value and to provide an enabling signal in response to an established relationship therebetween; and,
    (c) inhibiting means to inhibit the application of a gating signal to the next to be rendered conductive controlled rectifier in the absence of said enabling signal.
2. The invention in accordance with claim 1 wherein said reference signal has a value corresponding to a capacitor voltage sufficient to commutate a conducting controlled rectifier.
3. The invention in accordance with claim 1 or claim 2 wherein said means to develop said voltage signal includes means to sense the voltage across said commutating capacitor.
4. The invention in accordance with claim 1 or claim 2 wherein said means to develop said voltage signal includes means to sense the voltage across a next to be rendered conductive controlled rectifier.
5. The invention in accordance with claim 1 or claim 2 further including;
    (a) means to sense a current within said bridge; and,
    (b) means to render said inhibiting means ineffective until said current reaches a predetermined value.
6. The invention in accordance with claim 3 further including;
    (a) means to sense a current within said bridge; and,
    (b) means to render said inhibiting means ineffective until said current reaches a predetermined value.
7. The invention in accordance with claim 4 including;
    (a) means to sense a current within said bridge; and,
    (b) means to render said inhibiting means ineffective until said current reaches a predetermind value.

* * * * *